United States Patent [19]

Onodera

[11] 4,279,428
[45] Jul. 21, 1981

[54] VIBRATION ABSORBING DEVICE FOR MOTOR VEHICLE

[75] Inventor: Takayoshi Onodera, Toyota, Japan

[73] Assignee: Toyota Jidosha Kogyo Kabushiki Kaisha, Toyota, Japan

[21] Appl. No.: 95,937

[22] Filed: Nov. 20, 1979

[30] Foreign Application Priority Data

Aug. 14, 1979 [JP] Japan ................ 54/111240[U]

[51] Int. Cl.³ .................................................. B62D 7/16
[52] U.S. Cl. ...................................... 280/95 R; 280/95 A
[58] Field of Search .................... 280/89, 90, 93, 94, 280/95 R, 95 A

[56] References Cited

U.S. PATENT DOCUMENTS

| | | | |
|---|---|---|---|
| 2,139,666 | 12/1938 | Bogart | 280/89 |
| 3,779,575 | 12/1973 | Mazur | 280/95 R |

Primary Examiner—Joseph F. Peters, Jr.
Assistant Examiner—John A. Carroll
Attorney, Agent, or Firm—Finnegan, Henderson, Farabow, Garrett & Dunner

[57] ABSTRACT

In a motor vehicle wherein a front body and a rear body are placed on a frame structure independently of each other; a relay rod of a steering link, which is connected at the opposite ends thereof by way of knuckles to two wheels, is positioned at the front of the axle line; and these wheels are independently suspended from the frame structure; a vibration absorbing means is provided between the relay rod and a side rail of the frame structure. This vibration absorbing means acts to absorb the relative lateral vibration of the steering link to the frame structure, thus reducing the steering shimmy, the steering kick-back and the lateral vibration of the vehicle body.

5 Claims, 7 Drawing Figures

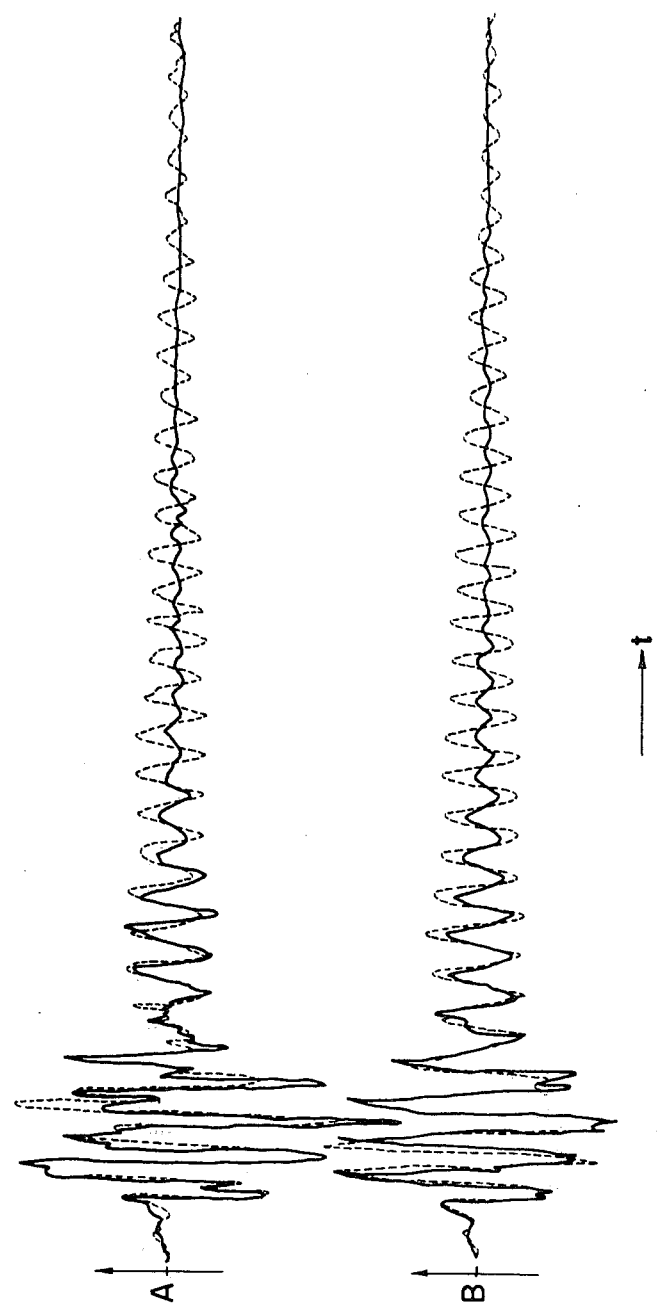

VIBRATION ABSORBING DEVICE FOR MOTOR VEHICLE

BACKGROUND OF THE INVENTION

1. Field of the Invention

This invention relates to a vibration absorbing device for a motor vehicle which absorbs both the vibration of the steering wheel and the lateral vibration of the vehicle body at a time.

2. Description of the Prior Art

It is known that the so-called tramping movement of left and right wheels, in which these wheel are moved vertically in opposite directions, is responsible for the repetitive vibrations in the circumferential direction of the steering wheel, the so-called steering shimmy. In order to prevent the steering shimmy, it has been proposed that in a motor vehicle in which front wheels are interconnected by way of a front rigid axle, a shock absorber is provided between a knuckle supporting the wheels and the rigid front axle, or the knuckle arm and a steering link. With a motor vehicle in which a front body and a rear body are placed on a frame structure independently of each other, a relay rod of the steering link extends at the front of the axle of the motor vehicle, and wheels are independently suspended from the frame structure, there occurs the peculiar steering vibration and body vibration, in addition to the steering shimmy arising with the rigid axle type motor vehicle, when the motor vehicle is run on a rough road.

SUMMARY OF THE INVENTION

It is accordingly an object of the present invention to provide a vibration absorbing device for a motor vehicle of the type in which a front body and a rear body are placed on a frame structure independently of each other, a relay rod of a steering link laterally extends at the front of the axle of the vehicle, and wheels are independently suspended from the frame structure; the aforesaid vibration absorbing device effectively reducing the steering vibration as well as the vibration of the vehicle body.

To attain the object, a vibration absorbing means is provided, according to the present invention, between a relay rod of the steering link and a side rail of a frame structure, so that the lateral vibration of the steering link relative to the frame structure is absorbed by the vibration absorbing means. The steering link is coupled at the opposite ends thereof by way of knuckles to wheels, respectively, stated otherwise, a vibration absorbing device is provided between a tie rod, which is a lower member with respect to a suspension system, and a frame structure which is an upper member. By such arrangement, the steering shimmy and vibration of a steering wheel such as the steering kick-back as well as the lateral vibrations of the vehicle bodies can be absorbed.

DESCRIPTION OF THE PREFERRED EMBODIMENTS

Figure 1:
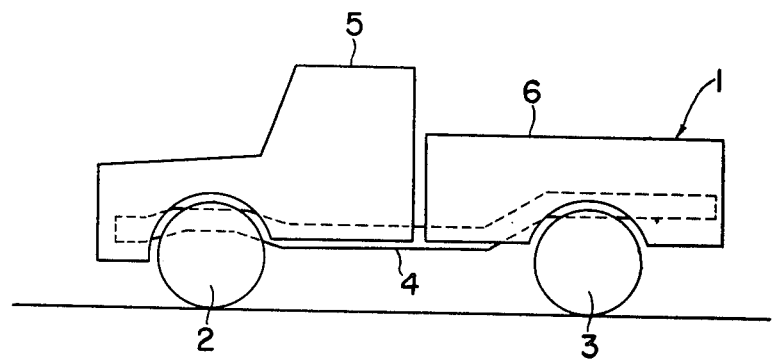
FIG. 1 is a schematic side view of a truck in which a front body and a rear body are placed on a frame structure independently of each other.

Referring first to FIG. 1, a truck 1 comprises front wheels 2, rear wheels 3, a frame structure 4 provided through the medium of a suspension system on the front and rear wheels 2 and 3, and front and rear vehicle bodies 5 and 6 placed on the frame structure 4 independently of each other.

Figure 2:
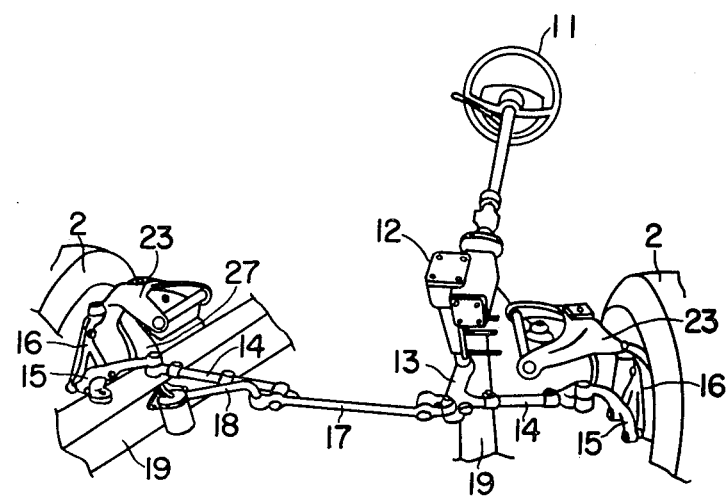
FIG. 2 is a schematic perspective view of a steering link.

As is appearant from FIG. 2 showing in detail a steering link, the operational force of a steering wheel 11 is transmitted by way of a steering gear box 12, a Pitman arm 13, tie rods 14 and knuckle arms 15 to knuckles 16, respectively. Two tie rods 14 are interconnected by way of a relay rod 17, and the knuckles 16 support the front wheels 2 rotatably, respectively. An idler arm 18 is attached to one end of the relay rod 17 which is opposite the Pitman arm 13, and supported by a side rail 19 of the frame structure 4. Two side rails 19 extend rearward of the vehicle body.

Figure 3:
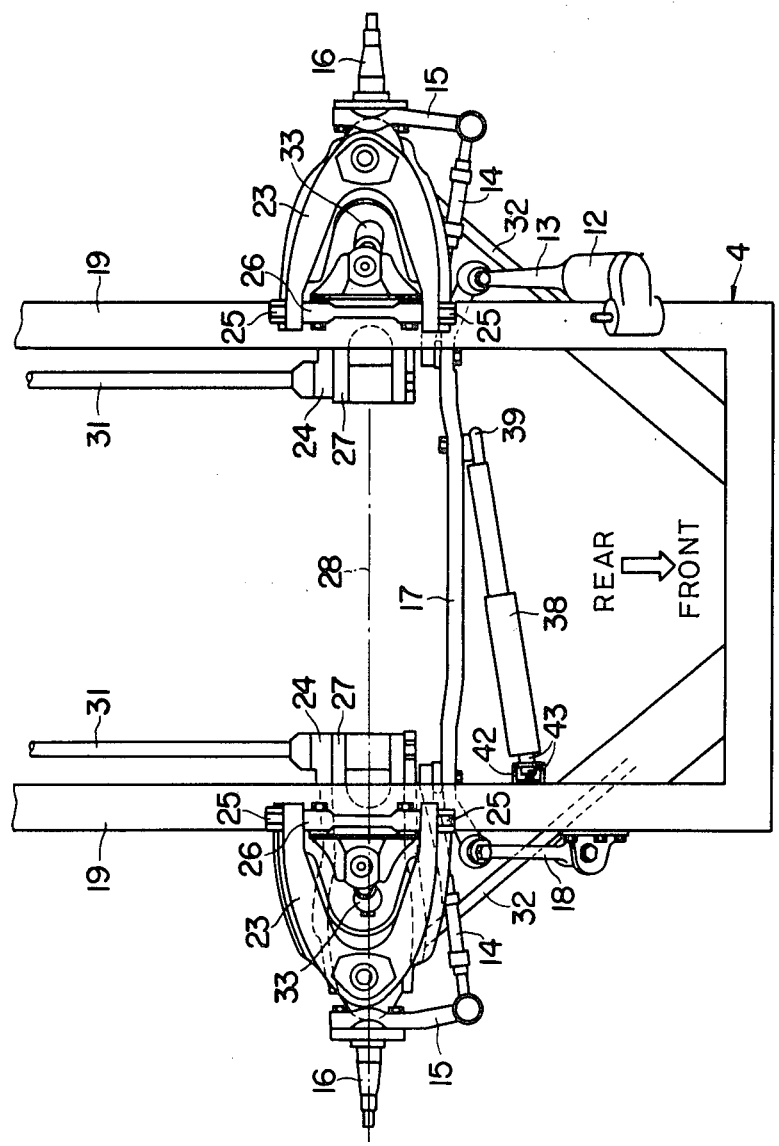
FIG. 3 is a plan view of a preferred embodiment of the present invention.

An independent suspension system is shown in FIG. 3. Knuckles 16 are supported at the upper ends thereof by upper arms 23 through the medium of ball joints, respectively, and at the lower ends thereof by lower arms 24 through the medium of ball joints, respectively. The upper arms 23 are attached by means of bolts 25 to shafts 26, which in turn are rotatably supported by brackets 27 fixed to the side rails 19, respectively. Brackets 27 rotatably support the lower arm 24.

A linear line connecting two knuckles 16 when directed exactly sideways of the vehicle body is called the axle line 28, and the relay rod 17 extends at the front of the axle line 28 between the opposite side rails 19.

Torsion bar springs 31 and strut bars 32 are provided between the lower arms 24 and the frame structure 4, so as to reduce vibration of the lower arms 24 properly. Shock absorbers 33 vertically extend and are coupled at the top and bottom ends thereof to the upper arms 23 and the lower arms 24, respectively.

Figure 4:
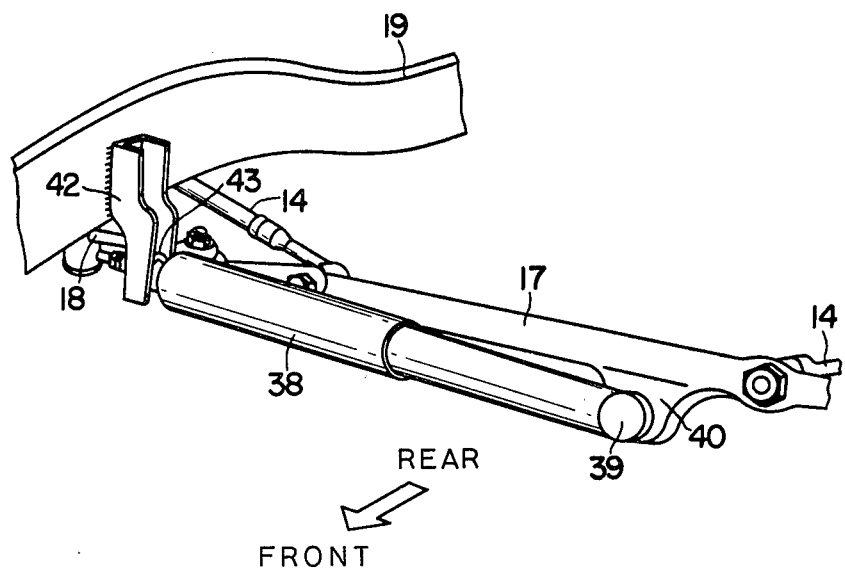
FIG. 4 is a fragmentary perspective view of a vibration absorbing means.

A vibration absorbing means 38 is the same in construction as a known telescopic type shock absorber, and coupled at one end thereof, by means of a ball joint 39, to a boss 40 (FIG. 4) formed on the relay rod 17 on the gear box side 12, and at the other end thereof extends to the idler arm 18. The vibration absorbing means 38 and the relay rod 17 are thus rotatably interconnected at the boss portion 40 by means of the ball joint 39. In connection with the other end of the vibration absorbing means 38, a bracket 42 is rigidly secured such as by welding to one side rail 19, and a rod of a given length is welded to the other end of the vibration absorbing means 38. A cushion rubber 43, a portion of the bracket 42, another cushion rubber 43 and a plate are fitted in the rod attached to the other end of the vibration absorbing means. The vibration absorbing means 38 and the bracket 42 are rigidly secured to each other by tightening a nut. The cushion rubber 43 acts to absorb the relative vibration of the vibration absorbing means 38 to the bracket 42 properly.

Figure 5:
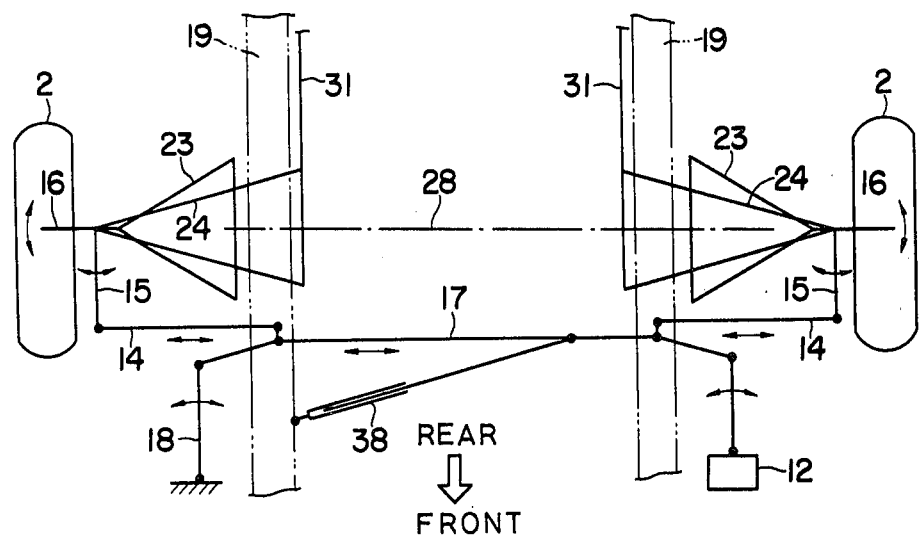
FIG. 5 is a diagrammatical plan view showing the positional relationship of the steering link to vibration absorbing means.
Figure 6:
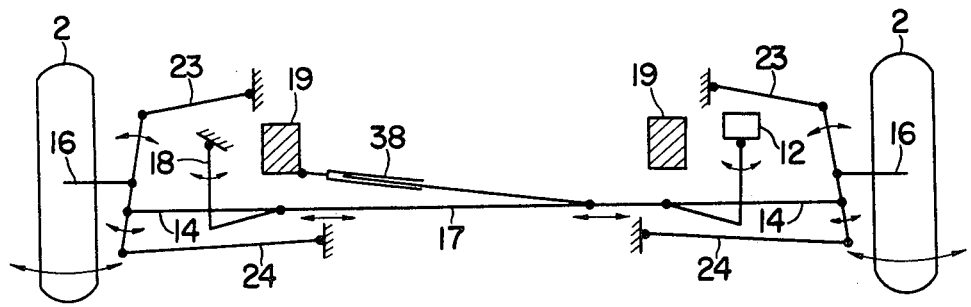
FIG. 6 is a diagrammatical front view showing the positional relationship of the steering link to the vibration absorbing means; and, FIG. 7 is a graph showing the test results of the device of the present invention.

FIG. 5 is a diagrammatical plan view showing the positional relationship between the steering link and the vibration absorbing means 38, as viewed from above, and FIG. 6 is a diagrammatical front view showing the positional relationship between the steering link and the vibration absorbing means as viewed from the front. As viewed from the horizontal plane, the vibration absorbing means 38 extends width wise of the vehicle body askew in a manner that the other end near to the side frame 19 is positioned frontward of the vehicle body and the one end coupled to the relay rod is positioned rearward thereof. As viewed from the vertical plane, the vibration absorbing means 38 is vertically inclined, with the other end near to the side frame 19 positioned up and the one end near to the relay rod positioned down.

Since the steering wheel 11 is operated at a comparatively slow speed, the operational force of the steering wheel is transmitted to the knuckles 16 independently of the vibration absorbing means 38, thereby controlling a direction of the front wheels 2.

In contrast thereto, since the vibration to be transmitted from the knuckles 16 to the steering wheel 11 or the vibration of the frame structure 4 generating when the motor vehicle is run on a rough road, is comparatively high in speed, then such vibration is properly absorbed by the vibration absorbing means 38, thus being reduced rapidly.

FIG. 7 is a graph of the results of tests carried out by running the motor vehicle on a given road, wherein the horizontal axis represents a time t, and the vertical axes A and B represent acceleration in the circumferential direction, of the steering wheel 11 and acceleration in the lateral direction, of the front body 5, respectively. The solid lines represent the characteristics of the motor vehicle including the vibration absorbing means 38 of the present invention, and the broken lines represent the characteristics of a motor vehicle having no vibration absorbing means. From the graph, it is seen that the steering shimmy and the lateral vibration of the body are largely reduced and rapidly attenuated.

As is apparent from the foregoing, the vibration absorbing means 38 connected to the relay rod 17 and the side frame 19 absorbs the relative, lateral vibration of the steering link to the frame structure 4, thus reducing the steering shimmy, the steering kick-back and the lateral vibration of the vehicle body.

What is claimed is:

1. In a motor vehicle having a front body and a rear body disposed independently of each other on a frame structure and a steering assembly including a relay rod disposed between opposed sides of said frame structure and positioned in front of the axle line, the relay rod being connected at the opposed ends thereof to opposed wheels by way of knuckles, said wheels being independently suspended from said frame structure, the improvement comprising:

vibration absorbing means having opposed ends interconnecting said relay rod with one side of said frame structure, one end of said vibration absorbing means proximate said one side being disposed in front of the vertical plane of said relay rod and above the horizontal plane of said relay rod, for absorbing vibration induced by said independently suspended wheels and said independent front and rear bodies in the longitudinal, lateral and vertical directions of the motor vehicle.

2. The vibration absorbing device as defined in claim 1, wherein the one end of said vibration absorbing means is coupled by way of cushion rubber to the one side of said frame structure.

3. The vibration absorbing device as defined in claim 1, wherein the other end of said vibration absorbing means is coupled by way of a ball joint to said relay rod.

4. A vibration absorbing device as defined in claim 1, wherein said vibration absorbing means is a telescopic type shock absorber.

5. The vibration absorbing device of claim 2 or 3 wherein the other end of said vibration absorbing means is coupled to said relay rod proximate its end remote from said one side.

* * * * *